(12) United States Patent
Beker et al.

(10) Patent No.: US 8,526,423 B2
(45) Date of Patent: Sep. 3, 2013

(54) METHOD AND DEVICE FOR MANAGING PERSONAL COMMUNICATIONS OF AT LEAST ONE USER

(75) Inventors: Sergio Beker, Biot (FR); Francois Bourdais, Issy les Moulineaux (FR)

(73) Assignee: France Telecom, Paris (FR)

( * ) Notice: Subject to any disclaimer, the term of this patent is extended or adjusted under 35 U.S.C. 154(b) by 936 days.

(21) Appl. No.: 12/087,295

(22) PCT Filed: Jan. 2, 2007

(86) PCT No.: PCT/FR2007/050600
§ 371 (c)(1),
(2), (4) Date: Jun. 30, 2008

(87) PCT Pub. No.: WO2007/077402
PCT Pub. Date: Jul. 12, 2007

(65) Prior Publication Data
US 2011/0103369 A1    May 5, 2011

(30) Foreign Application Priority Data

Dec. 30, 2005  (FR) ..................................... 05 54147
Dec. 30, 2005  (FR) ..................................... 05 54150

(51) Int. Cl.
*H04L 12/66* (2006.01)
(52) U.S. Cl.
USPC ........................................................ 370/352
(58) Field of Classification Search
None
See application file for complete search history.

(56) References Cited

U.S. PATENT DOCUMENTS

| | | | |
|---|---|---|---|
| 5,742,905 A | 4/1998 | Pepe et al. | |
| 6,947,410 B1 * | 9/2005 | Schwartz et al. | 370/352 |
| 7,065,069 B1 * | 6/2006 | Echols | 370/352 |
| 7,336,649 B1 * | 2/2008 | Huang | 370/352 |
| 2002/0143856 A1 * | 10/2002 | Sastri et al. | 709/202 |
| 2002/0178381 A1 * | 11/2002 | Lee et al. | 713/201 |
| 2004/0037219 A1 * | 2/2004 | Shaffer et al. | 370/217 |
| 2006/0050864 A1 * | 3/2006 | Shaffer et al. | 379/265.02 |

FOREIGN PATENT DOCUMENTS

| | | |
|---|---|---|
| EP | 1 211 877 | 6/2002 |
| WO | WO 98/19438 | 5/1998 |

* cited by examiner

*Primary Examiner* — Minh-Trang Nguyen
(74) *Attorney, Agent, or Firm* — Knobbe Martens Olson & Bear LLP

(57) ABSTRACT

A device for managing calls sent by a local terminal (T1-T5) includes: an interface (11-15) for communication with each of said local terminals (T1-T5) communications client modules (CL2-CL5) each able to set up a communications link of a communications service with a distant terminal (T6-T10) via a communications network; and routing means (18) for selecting, should one of the communications client modules receive an incoming call from a distant sending terminal, a local terminal able to receive said call and to redirect said call to the communications interface with the selected local terminal in order to set up a communications link between said distant sending terminal and the selected local terminal via the communications client module receiving the call.

14 Claims, 1 Drawing Sheet

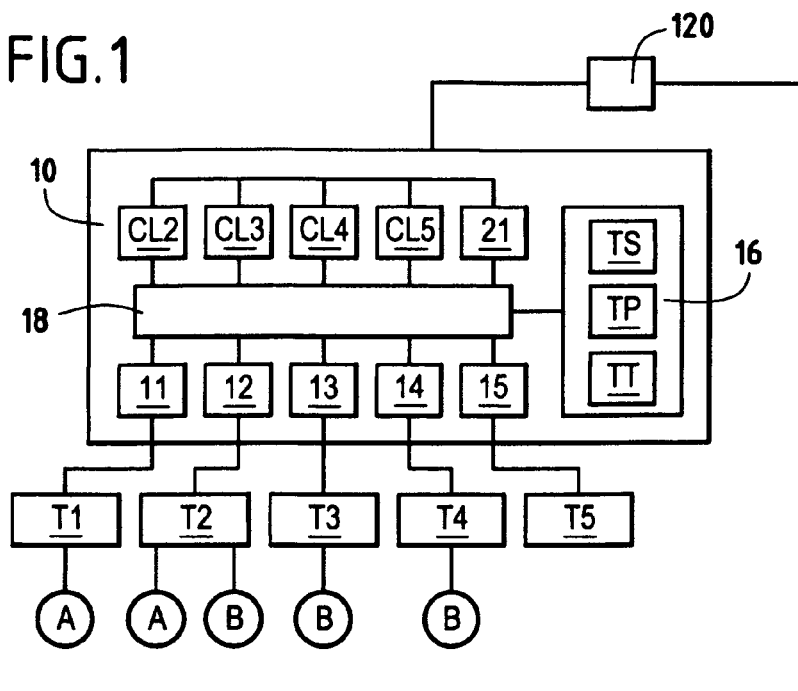

METHOD AND DEVICE FOR MANAGING PERSONAL COMMUNICATIONS OF AT LEAST ONE USER

RELATED APPLICATIONS

This is a U.S. National Phase Application under 35 USC 371 of International Application PCT/FR2007/050600, filed on Jan. 2, 2007.

This application claims the priority of French application nos. 05/54147 and 05/54150 both of which were filed on Dec. 30, 2005, and the content of both of which is hereby incorporated by reference.

BACKGROUND OF THE INVENTION

The field of the invention is that of systems for managing personal communications of one or more users.

The invention finds a special but non-limiting application in a residential context in which users share terminals of different types to communicate with distant terminals via one or more telecommunications networks.

In this invention, the local terminals and the distant terminals can be of any type, including analog telephones, GSM or GPRS mobile telephones, videoconference systems using the H323 protocol, voice over IP (Internet Protocol) terminals, and personal digital assistants (PDA).

The introduction of mobile telephones and the increasing bit rates available on the Internet have accelerated the growth of numerous telecommunications services.

In the present document, a telecommunications service is to be associated with a closed user group consisting of users able to communicate with each other using in particular a set of communications protocols and common registration procedures.

This relates, in a manner that is known in the art and is not limiting on the invention, to:
  public switched telephone network (PSTN) services;
  GSM or GPRS services;
  voice over IP (VoIP) services; and
  instant messaging (IM) services.

To access a particular communications service, each potential recipient of a call, referred to here as a contact, must have a user account associated with the service. That account is generally set up by the service operator when the user first subscribes to the service and is closed or deactivated by the operator following termination of the subscription.

The contact or user account is associated with one or more physical people.

It is identified by a name which, if the user account is specific to a single physical person, is usually the name and/or the forename of the person.

This kind of account includes one or more identifiers for identifying the server or the terminal to which the call is sent and by means of which a contact can be contacted. It optionally also includes a password, and where appropriate other attributes defining the service, for example charge structure and bandwidth conditions defined at the time of taking out the subscription.

For the PSTN service or a mobile telephone service, the identifier of a user account is simply a telephone number.

For an instant messaging service, the identifier is a messaging address.

For a voice over IP service, the identifier is a character string chosen by the user, the operator verifying that this identifier is uniquely defined within the closed user group at the time the subscription to the service is taken out.

The various communications services use various types of communication. For each type of communication, a terminal must have certain predefined minimum technical capabilities in order to be able to set up a communications link with the communications service.

Here references to the capabilities of a terminal refer to all parameters defining the capabilities of the terminal in relation to setting up communications sessions. Those parameters define in particular:
  the call set-up protocols supported (H320, H323, SIP, GSM, PSTN, etc.);
  algorithms for encoding and/or decoding supported audio and/or video streams;
  the telecommunication media offered by the terminal: audio only, video only (real time, streaming, etc.), audio and video, etc.;
  the stream processing characteristics: minimum latency time required by the network, bit rates supported, loss of packets tolerated, connection speed, etc.

For example, a distinction is drawn at a first level between the text, voice, and video types of communication, each of these types requiring specific capabilities in the terminals.

At a second level, real time/asynchronous processing of text messages imposes constraints on terminals such that it is advantageous to define SMS and instant messaging (IM) communication types.

On the basis of the above service examples:
  the PSTN service supports voice type communication;
  the GPRS service supports voice and text type communication;
  an instant messaging service supports, as appropriate, either only text type communication or additionally voice or video type communication.

The person skilled in the art will understand this concept of communication type is liable to evolve with future generations of terminals. For example, it is considered here that the LCD screens available at this time are all capable of displaying color, and that it is only necessary to define the video communication type, whereas a few years ago it would have been necessary to define black and white video and color video types.

The proliferation of new telecommunications services referred to above is accompanied, especially in the residential context, by an explosion in the number of terminals available to and shared by users (fixed telephones, mobile telephones, personal computers, personal digital assistants, etc.).

At the present time, setting up and managing user accounts for accessing various communications services from this plurality of terminals is becoming excessively complex.

OBJECT AND SUMMARY OF THE INVENTION

A main object of the present invention is to eliminate the drawbacks referred to above by proposing a call manager device simplifying the use and management of various communications services by users of the device.

One aspect of the invention relates to a device for managing calls on behalf of a plurality of local terminals, this device including:
  a communications interface with each of said local terminals;
  communications client modules each adapted to set up a communications link of a communications service with one or more distant terminals via a communications network; and
  routing means for:

on reception by one of the communications client modules of an incoming call from a distant sending terminal, selecting one or more local terminals able to receive said call and to redirect said call to the communications interface with the selected local terminal in order to set up a communications link between said distant sending terminal and the selected local terminal via the communications client module receiving the call; and on reception of an outgoing call request via a communications interface with a local sending terminal, identifying a communications client module able to set up a communications channel of a selected communications service and to transmit the request to the identified communications client module in order to set up a communications link of the selected service between a distant destination terminal and the local sending terminal via the identified communications client module.

In the usual way, a call is referred to as outgoing if it is sent by a local terminal and as incoming if it is sent to a local terminal.

Another aspect of the invention relates to a method of managing calls on behalf of local terminals, this method being implemented by a device including a communications interface with each of said local terminals and communications client module each associated with one or more communications services, the method including:

on reception by one of the communications client modules of an incoming call from a distant sending terminal, a step of selecting one or more local terminals and a step of redirecting said call to a communications interface with the selected local terminal in order to set up a communications link between said distant sending terminal and the selected local terminal via the communications client module receiving the call; and on reception of an outgoing call request via a communications interface with a local sending terminal, a step of identifying a communications client module able to set up a communications link of a selected communications service and a step of transmitting a request to the identified communications client module in order to set up a communications link between a distant destination terminal and the local sending terminal via the identified communications client module.

The call manager device can be integrated into a gateway or a server inserted between the local terminals and the communications network and providing a communications proxy between the local terminals and the distant terminal(s). The invention also relates to a proxy server including a call manager device of the invention.

The call manager device of the invention includes communications interfaces with the local terminals, service and/or terminal selector means, session set-up means, communications modules adapted to implement each of the communications services with the equivalent clients of distant terminals called upon to communicate with the device, and means for routing data and/or data streams between firstly the communications interfaces and secondly the communications modules.

The communications link set up between the local terminal and the distant terminal by the communications module of the call manager device of the invention is in two portions, namely:

a portion between the local terminal and the call manager device; and a portion between that device and the distant terminal.

The call manager device therefore provides a communications relay between the local terminal and the distant terminal.

The invention advantageously simplifies the hardware and software architecture of the local terminals because, to communicate with the call manager device of the invention, they use a device that provides a communications proxy for the local terminals.

The portion of the communications link between the device of the invention and a local terminal preferably uses a unique signaling protocol independent of the communications service and therefore of the associated communications module via which the connection is set up, as well as a predefined unique data transport protocol. The data transport protocol is compatible with the signaling protocol used and preferably generic and specific to each type of the following basic communication types: voice, video, text.

Consequently, it suffices for a terminal to be able to communicate with the device of the invention by means of the signaling protocol adopted and a transport protocol appropriate to the type of communications service to be implemented, so that, following addition to the device of the invention of a new communications client module associated with a new communications service, that terminal can send or receive a call via the new service, without any configuration of the terminal being necessary. For example, a local terminal, able to communicate with the device of the invention by means of a generic transport protocol suitable for implementing an instant messaging type communications service, can communicate with different communications client modules associated with different instant messaging services. It is therefore able to receive instant messaging type calls from the various modules with a unique local communications module.

The manager device of the invention preferably includes conversion means for converting first data conforming to the generic transport protocol specific to one type of communication into second data conforming to a particular communications protocol of the same type used for a given communications service, or vice-versa.

In the above example, these means provide conversion between the instant messaging type generic transport protocol and one or more particular instant messaging protocols corresponding to the service(s) implemented by the associated client modules of the device.

In addition to this, because of the centralized management of calls by the device of the invention, especially centralized management of routing of calls between the communications client modules and the interfaces with the terminals, different call management functions, usually implemented in the local terminals, can be transferred to the central call manager device of the invention. These functions include contact list management functions and user and terminal availability management functions. As a result of this, the contact lists and availability information are managed independently of the incoming or outgoing call type (instant messaging or other type) and of the terminal via which the user is connected. Configuring the local terminal is simplified and this information is managed in a centralized and unified manner. In particular, it is no longer necessary to configure each local terminal by means of contact lists, whether those lists are specific to a service or to a user.

The local communications module of the local terminal is a simplified communications client module, compared to a client module such as would be installed on an autonomous terminal, i.e. a terminal that would send and receive calls directly, without going through the intermediary of the call manager device of the invention. In this sense, the simplified client module is referred to as a lightweight client.

The communications module of the terminal can send and receive signaling data or messages in a unique predefined signaling protocol, for example the SIP, that is independent of the selected communications service, and send or receive raw voice or video data streams conforming to the data transport protocols, which are compatible with the SIP.

Thus incoming signaling data is converted in the device so as to conform to the SIP, before routing it to the terminals of users, the audio, video or text data streams being converted only if they use a protocol that is not compatible with the signaling protocol.

For example, if the call manager device receives an incoming call to set up an instant messaging service session, it receives the message via its instant messaging client and then constructs an SIP message using the MESSAGE method (see RFC 3428 http://www.ietf.org/rfc/rfc3428.txt) and routes that SIP message to one or more user terminals.

For more information on the SIP, the person skilled in the art can refer to the document RFC 3261 of the IETF (Internet Engineering Task Force).

Alternatively, any other communications protocol can be used between the device of the invention and the local terminals, in particular the signaling protocol from the H323 protocol suite.

Data streams are therefore exchanged between the terminal sending the call and the terminal to which the call is sent without passing in transit through the call manager device.

The client communications module specific to a service, which is installed in a call manager device of the invention, is able to manage a communications session for each user connected to the device.

One embodiment of the manager device of the invention includes service selector means for selecting, for an outgoing call and as a function of a service selection rule, a communications service by means of which a contact can be contacted.

Similarly, in another embodiment, the device includes terminal selector means for selecting, for an incoming call and as a function of a terminal selection rule, one or more local terminals by means of which a user associated with a contact can be contacted.

In the present document, stating that a contact can be contacted via a service implies that the user(s) associated with that contact have registered with a service provider to access the service, that they have a user account associated with the service, and that they can therefore be contacted by a terminal capable of using a communications link of the service. This does not necessarily mean that they are present and/or available at a given time to be contacted via the service. For example, it is considered that a person can be contacted by telephone via the PSTN service if they subscribe to that service, even if they are not near their telephone or their line is busy or faulty.

The service selector means are preferably also adapted to select a service for an outgoing call as a function of one or more criteria of cost and the availability of a contact using said remote terminal.

The terminal selector means are preferably also adapted to select a terminal for an incoming call as a function of a terminal selection rule taking account of data relating to the ability of said local terminals to implement communications services. Thus each local terminal that has the capabilities required to implement the types of communication of a particular service can access that service using a communications module integrated into the terminal, common to the various possible types of service and communication, and without it being necessary to set up a user account or a client specific to this service in each of the terminals.

In one particular embodiment, the terminal selection rule uses a criterion of the availability of said local terminals and/or a criterion of the availability of the users of said local terminals.

In one particular embodiment, the manager device of the invention includes means adapted, for an incoming call, to send a notification message to one or to each of the selected terminals, the routing means selecting the local terminal or terminals that respond positively to that notification.

In one particular embodiment, the notification message is sent to the local terminals in an order established as a function of a preference rule.

The service selection rule preferably uses criteria of the relative priority of a plurality of communications services by means of which the contact can be contacted.

In a preferred embodiment, the various steps of the call management method of the invention are determined by computer program instructions.

Consequently, the invention is also directed to a computer program on an information medium, that can be executed in a manager device or more generally in a computer, and that includes instructions adapted to execute the various steps of the above method of managing outgoing calls and/or the various steps of the above method of managing incoming calls.

This program can use any programming language and take the form of source code, object code or an immediate code between source code and object code, such as a partially compiled form, or any other desirable form.

The invention is also directed to a computer-readable information medium containing instructions of the above computer program.

The information medium can be any entity or device capable of storing the program. For example, the medium can include storage means, such as a ROM, for example a CD ROM or a microelectronic circuit ROM, or magnetic storage means, for example a diskette (floppy disk) or a hard disk.

Moreover, the information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit into which the program is incorporated, the circuit being adapted to execute the method in question or to be used in its execution.

Another aspect of the invention relates to a terminal including:
  means for receiving a notification from a call manager device in order to set up a communications link of a communications service between said terminal and a distant terminal sending a call;
  means for sending said call manager device an outgoing call request including an indication relating to one or more selected contacts and a communications service in order to set up a communications link via said device between said local terminal and a distant destination terminal via which said contact can be contacted via a communications service corresponding to that indication;
  a communications module for setting up a communications link of a communications service with a distant terminal via a communications client module of said call manager device.

BRIEF DESCRIPTION OF THE DRAWINGS

Other features and advantages of the present invention emerge from the description given below with reference to the appended drawings, which show one non-limiting embodiment of the present invention. In the figures:

FIG. 1 represents, in its environment, a proxy server including a preferred embodiment of a device of the invention; and FIG. 2 is a flowchart representing the main steps of a preferred embodiment of a call management method of the invention.

DETAILED DESCRIPTION OF ONE EMBODIMENT

FIG. 1 represents a proxy server 10 that includes a call manager device of the invention.

This proxy server 10 is connected to the public switched telephone network R1 and to the Internet R2 via an ADSL modem 120.

In the example described here, A and B denote two users of the proxy server 10.

It is assumed that the proxy server 10 offers users A and B five communications services:

S1: PSTN telephone service;
S2: voice over IP service;
S3: first instant messaging service;
S4: second instant messaging service; and
S5: GSM service.

In this example, the user A is identified on two terminals T1, T2 and the user B on three terminals T2, T3, T4.

These terminals are, respectively:
a personal digital assistant T1;
a voice over IP device T2;
a videoconference system T3; and
a personal computer T4.

The users A and B also use an analog telephone T5 suitable for the PSTN R1.

In the example described here, each of the four terminals T1 to T4 is adapted to implement an IP (Internet Protocol) type communications protocol. It is assumed in this example that the Internet addresses of the terminals T1 to T4 are respectively @T1, @T2, @T3 and @T4.

It is further assumed in this example that the users A and B have two contacts D and E who have analog telephones T6 and T7 connected to the public switched telephone network R1.

There are shown connected to the Internet R2:
a terminal T8 of the contact D adapted to implement the voice over IP service S2;
a terminal T9 of the contact D adapted to implement the first messaging service S3;
a terminal T10 of the contact E adapted to implement the voice over IP service S2; and
a GSM terminal T12 of the user D.

This device includes communications interfaces 11 to 14 for communicating with the local terminals T1 to T4. These communications interfaces include suitable hardware means (network cards, connectors, senders/receivers) and software means (drivers) for each of the terminals. For example, these means can consist of means for conforming to the 802.11 Ethernet or WiFi standards defined by the IEEE.

In the example described here, the communications interfaces 11 to 14 are adapted to communicate using the SIP with a communications module referred to as a lightweight client of the terminals T1 to T4.

The call manager device of the proxy server 10 includes communications modules CL2-CL5 each adapted to set up a communications link conforming to a communications service to a distant terminal via a communications network.

Where the transport of raw data is concerned, the communications module (lightweight client) of the terminals T1 to T4 communicates with the proxy server using a generic transport protocol specific to each type of communication supported by each terminal.

The communications link set up between one of the local terminals T1 to T4 and a distant terminal T6 is either set up for the entire duration of a call if it is a question of voice and/or video-type communication, for example telephone or video-conference communication, or set up on a one-off basis to enable sending of messages or data in a text-type call (SMS, instant messaging, electronic mail, etc.).

In the context of the invention, the communications link set up between one of the local terminals T1 to T4 and a distant terminal T6 or T7 accessible via the network R1 or R2 includes two connecting portions, namely:

a first portion between the local terminal and the communications module concerned, in which a predefined signaling protocol and a generic transport protocol are used; and a second portion between this communications module and the distant terminal, in which the communications protocol corresponding to the communications service associated with the communications module concerned is used.

Here the communications module serves as a communications relay between the communications module (lightweight client) of the terminals T1 to T4 and the remote terminal T6 or T7, in the sense that the data and/or the communications stream exchanged via this communications link passes in transit through the proxy server via the communications module of the device.

Accordingly, where the payload data (audio, video, text or messages) is concerned, the call manager device includes conversion means for converting payload data and streams conforming to a first communications protocol received by a communications client module of the manager device into data and streams conforming to the generic transport protocol specific to the target call type. This applies even to the signaling data and streams received by the communications client module of the manager device, which are converted into signaling data and streams conforming to the signaling protocol used between the local terminal and the manager device.

In a symmetrical way, the call manager device includes means for converting payload or signaling data and/or data streams received via a communications interface associated with a terminal, which data conforms to the predefined protocol used between the local terminal and the device, into data and/or data streams conforming to a second protocol specific to the communications service associated with the destination communications module, the latter data then being transmitted to that communications module.

All of the exchanged signaling data sent between a terminal and the device of the invention is exchanged in accordance with the SIP. The other data or data streams (raw data, audio, video, etc.) are converted only if their format or their protocol is not compatible with SIP signaling.

The various communications modules are:
a client communications module CL2 adapted to implement the voice over IP service S2, and in particular to set up a session with a distant terminal providing access to this service;

a client communications module CL3 adapted to implement the first instant messaging service S3, and in particular to set up a session with a distant terminal providing access to this service;

a client communications module CL4 adapted to implement the second instant messaging service S4, and in particular to set up a session with a distant terminal providing access to this service; and a client communications module CL5 adapted to implement the GSM service S5, and in particular to set up a session with a distant terminal providing access to this service.

The call manager device also includes a connection interface, in the form of a RJ11-type input 15 to which the PSTN analog telephone T5 is connected, and an interface 21 to the public switched telephone network, for setting up a session between the analog telephone T5 and another analog telephone connected to the PSTN. In the example described here, the port associated with this input RJ11 is denoted @T5.

The call manager device comprises a functional layer taking the form of middleware for interfacing between firstly the communications modules CL2 to CL5 and 21, and secondly the communications interfaces 11 to 15.

Each client module CL2 to CL5 and 21 has the same functions as a client module installed on an autonomous terminal, i.e. a terminal that would send and receive calls directly, without passing through the manager device of the invention.

In the context of the invention, each client module of the call manager device communicates with and furthermore cooperates with the middleware to implement the following functions in the call manager device:

managing storage functions in relation to the communications service associated with each of the communications modules of the device;

managing the availability of each terminal and/or each user via the associated communications service;

managing contact lists by user and by communications service, and overall contact lists for each user;

incoming and outgoing call management.

The middleware 18 manages and stores in a centralized manner lists of contacts and information relating to the availability of the terminals and the availability of the users of each of the terminals for each of the communications services.

The middleware 18 also participates in server registration procedures at the time of setting up a user account to provide access to a communications service. It stores user account data for each user/communications service pair for which a user account has been created.

The middleware 18 is further responsible for centralized management of incoming and outgoing calls. It manages the strategies for sending notifications to terminals and processing responses or non-responses. It holds information relating to the capabilities of the various terminals to implement a communications service. It applies service and terminal selection rules, notably as a function of the preferences of the users of the terminals T1 to T5.

The middleware 18 also has an incoming and outgoing call routing function. For an incoming call, the middleware selects the terminal to which the incoming call must be routed and redirects the call to the communications interface for that terminal. For an outgoing call, the middleware selects a communications service and redirects the call to the communications client module associated with the selected communications service to set up the call. The process is described in more detail below.

In addition to its call routing function, the middleware 18 is adapted to convert between the SIP and each of the protocols used by the communications clients CL2 to CL5.

The middleware 18 is adapted to set up a call with the lightweight client of the terminals T1 to T4 using the SIP for signaling. It is adapted to obtain from each of the clients CL2 to CL5 payload data or a payload data stream (voice message, text, video, etc.) sent by that client and to send it to the lightweight client using the generic transport protocol.

It is also adapted to obtain from each of the lightweight clients of the terminals T1 to T4, via the communications interfaces 11 to 14, data or a data stream sent by the lightweight client and to convert that data stream into a stream conforming to the protocol or protocols used by the client module CL2 to CL5 to which the stream is redirected.

The communications services S1 to S5 provide different types of communication. Each of the terminals T1 to T5 can implement a communications service or a type of communication only if it has the necessary capabilities.

In the example described here, it is considered that:

the PSTN telephone service S1 can be accessed by any terminal able to manage the voice communication type;

the service S2 on IP networks can be accessed by any terminal able to manage the voice, text or video communication type;

the instant messaging service S3 can be accessed by any terminal able to manage the voice, text or video communication type;

the instant messaging service S4 can be accessed by any terminal able to manage the text communication type; and the GSM service S5 can be accessed by any terminal able to manage the voice and text communication types.

In the preferred embodiment described here, the device of the invention comprises data storage means 16 (memory, hard disk, etc.) for storing data used to manage calls.

The storage means 16 include a table TT of terminals defining, for each of the terminals T1 to T5, the capabilities, addresses, and availabilities of those terminals and information as to whether or not they are used by the users A and B.

In the example described here, this table TT has the following content:

| Terminal Table TT | | | | | | | |
|---|---|---|---|---|---|---|---|
| | | | | Capabilities | | | |
| | A | B | Avail | Voice | IM | SMS | Video | @ |
| T1 | 1 | 0 | 1 | 1 | 1 | 0 | 0 | @T1 |
| T2 | 1 | 1 | 1 | 1 | 0 | 0 | 0 | @T2 |
| T3 | 0 | 1 | 1 | 1 | 0 | 0 | 1 | @T3 |
| T4 | 0 | 1 | 1 | 1 | 0 | 0 | 1 | @T4 |
| T5 | 1 | 1 | 0 | 1 | 0 | 1 | 0 | @T5 |

This table has five rows, one for each of the terminals T1 to T5 of the users A and B.

Each of these rows includes the following information:

the name of the terminal (T1 to T5);

a binary value equal to 1 if the terminal is used by the user A and equal to 0 if not;

a binary value equal to 1 if the terminal is used by the user B and equal to 0 if not;

a binary value equal to 1 if the terminal is available and equal to 0 if not;

a binary value equal to 1 if the terminal supports the voice communication type and equal to 0 if not;

a binary value equal to 1 if the terminal supports the IM communication type and equal to 0 if not;
a binary value equal to 1 if the terminal supports the SMS communication type and equal to 0 if not;
a binary value equal to 1 if the terminal supports the video communication type and equal to 0 if not; and
an address enabling the proxy server 10 to contact the terminal.

Alternatively, the availability of a user on a terminal is not coded in a binary manner but with different levels, as for instant messaging tools: available, present, do not disturb, not connected, etc.

Alternatively, the availability of a user is coded to take account of the various communications services for which they have an account. A user can be available on one service and not available on another.

Any other variant of or any other combination of the above variants can be envisaged.

The user and/or terminal availability information is preferably updated automatically by the device of the invention, as a function of calls set up, changes of availability in the communications services (especially instant messaging), and connection management information obtained from the communications modules CL2 to CL5.

In the example described here, the storage means 16 include a table TS of services for storing, for each of the users A and B and for each of the contacts D and E of those users, one or more accounts of those users A and B associated with a communications service.

In the example described here, this table TS is as follows:

| Service Table TS | | | | | | | | | |
|---|---|---|---|---|---|---|---|---|---|
| | S1 | | S2 | | S3 | | S4 | | S5 |
| A | A-S1 | 1 | A-S2 | 1 | A-S3 | 0 | A-S4 | 1 | |
| B | B-S1 | 1 | B-S2 | 0 | B-S3 | 1 | | | |
| D | D-S1 | 1 | D-S2 | 1 | D-S3 | 0 | | | D-S5 1 |
| E | E-S1 | 1 | E-S2 | 0 | | | | | |

If a user A, B or a contact D, E has an account for accessing one of the service S1 to S5, that account is stored in the table TS.

For example, the person skilled in the art will understand from the above table that the contact D has an account D-S1 for the service S1, an account D-S2 for the service S2, an account D-S3 for the service S3, and an account D-S5 for the service S5, but has no account for the service S4.

In the preferred embodiment described here, the table TS also stores a binary value equal to 1 if a user can be contacted by a service and equal to 0 if not.

For example, the person skilled in the art will understand that the user B can be contacted via the services S1 and S3 but not via the service S2.

Outgoing Call Management

The call manager device of the proxy server 10 is adapted to receive a request from the analog telephone T5 or the SIP lightweight client of a terminal T1 to T4 via the communications interfaces 11 to 14 for a user in the list of contacts stored in the table TS of the terminal sending the request to contact a selected contact D by means of an appropriate user interface.

According to the invention, the call manager device of the proxy server 10 includes means for selecting a communications service by means of which the selected contact can be contacted.

In the embodiment described here, the selector means are implemented in the functional layer 18 of the proxy server 10. To select a service, the selector means use a service selection rule SSS for outgoing calls.

The rule SSS uses one or more of the following criteria:
the relative priority of the communications services via which the selected contact can be contacted;
the availability of the contact via the selected communications service;
the communication cost of the communications services via which the selected contact can be contacted.

The priority criterion is defined in a table TP of priorities, for example, stored in the storage means 16.

This table TP has four columns as a function of the required communication type, namely voice, IM, SMS and video.

| Priority Table TP | | | |
|---|---|---|---|
| | Voice | Text | Video |
| S1 | 3 | | |
| S2 | 1 | 2 | 2 |
| S3 | 2 | 1 | 1 |
| S4 | | 4 | |
| S5 | 4 | 3 | |

This priority table TP summarizes the priorities for the user A. Of course, the proxy server 10 of the invention can include an identical or similar table for the other user B and for each of the contacts D and E.

This table must be read as follows: if a service initiated by a user A requires voice type communication, the proxy server 10 of the invention gives priority to selecting the voice over IP service S2, if that is not possible the first instant messaging service S3, then the PSTN telephone service S1, then the GSM service S5.

These priorities, which constitute the outgoing call service selection rule, can themselves depend on cost criteria.

In the preferred embodiment described here, the outgoing call service selection rule SSS also uses a criterion relating to the availability of the contact D, binary information representing that availability being stored in a table for each contact from the list of contacts.

Thus if the contact is the person D in the above scenario, and if selecting the voice over IP service S2 fails, the proxy server 10 of the invention selects the PSTN telephone service S1 and then the GSM service S5, as the contact D is not contactable via the first instant messaging service S3.

If service selection uses priority criteria to select one of the various services via which the contact for whom the call is intended can be contacted, i.e. a service for which the contact for whom the call is intended has an account, service selection can be managed automatically by the call manager device of the invention, the user initiating the call having only to select a contact.

A first option is for the user initiating the call to use an appropriate user interface implemented on the local terminal T1 to T4 to select manually the service via which they wish to contact a contact.

A second option is for the user initiating the call to indicate their preferred choice of service, for example the required type of communication or an order of preference, the call manager device giving priority to attempting to contact that contact by means of a user account associated with a service of the preferred communication type, for example an instant messaging service, then, if this fails, a voice over IP service, then, if this again fails, a GSM telephone service.

For example, the user can set the parameters of the proxy server of the invention so that, on receiving an outgoing call signal, it attempts to direct that voice call to one of the communications modules supporting voice type communication and then, if that fails, to another communications module supporting voice type communication.

In one particular embodiment, the outgoing call service selection rule makes use of communication cost criteria for the communications services via which the selected contact can be contacted. Those cost criteria can in particular take account of the time at which the outgoing call signal is received by the call manager device of the invention.

In one particular embodiment, the outgoing call service selection rule can prohibit the use of a given communications service during a given time period.

In one particular embodiment of the invention, the outgoing call service selection rule uses criteria relating to the availability of the contact to select the service. Information as to the availability of a contact in the list of contacts for each of the communications services can be obtained by the middleware consulting the communications module that is associated with each of those services and manages information as to the availability and/or connection status of the contact. Instant messaging type services in particular manage contact availability continuously.

Incoming Call Management

The call manager device of the proxy server 10 is adapted to receive a call signal from a contact sent by a distant terminal T6 to T12 using a communications service to a contact associated with one or more users A of one or more of the terminals T1 to T5.

According to the invention, the call manager device of the proxy server 10 includes means for selecting at least one of the terminals having a user who is the user or one of the users associated with the contact A, as a function of the communications service via which the call signal is received and a selection rule SST.

In the embodiment described here, the selector means are implemented in the functional layer 18 of the proxy server 10.

The selector means are adapted to select one or more terminals as a function of the communications service via which the call signal is received, in particular as a function of the communication type required by the service associated with the call, and as a function of the terminal selection rule SST. This rule SST takes account at least of the data TT relating to the capabilities of said terminal to implement communications services.

In one particular embodiment, the server 10 stores information as to the availability of the users of each terminal and the terminal selection rule SST uses a criterion relating to said information as to the availability of the users.

For example, a number of users may have been declared to the proxy as being attached to/contactable via the same terminal. The proxy then specifies the addressee of the call on the terminal concerned, for example using a different ringtone for each user.

In the embodiment described here, the terminal selection rule SST is implemented by the service table TS and the terminal table TT.

For example, if an incoming call intended for the contact A is received via a service S2 requiring a voice communication type, the call manager device of the proxy server 10 first selects a terminal having the capability to receive a voice type call (see terminal table TT).

It then select a terminal from the three terminals T1, T2, and T5 supporting a voice type call via which the user A can be contacted (see the terminal table TT).

An incoming call via the PSTN can be treated in the same way as for a user of an Internet telephone communications service, except that the user is unique and is treated as if registered with all the terminals simultaneously. A behavior profile for incoming calls associated with this user can be defined.

The server is adapted, if a number of terminals have been selected on the basis of the selection rule SST, to send a notification message to each of the selected terminals and then to select a terminal to set up said communications link that responded positively to the notification.

Alternatively, the server is adapted, if a number of terminals have been selected, to select a first of the selected terminals as a function of a rule of preference, then to send a notification message to the first terminal selected, and then to select a second terminal if the first terminal selected does not respond to the notification.

The main steps of the call management method of the invention are described below with reference to FIG. 2. It is assumed in this example that the method is implemented by the proxy server 10 described above.

During a first step E10, the proxy server 10 receives a call (call signal or request) and tests if the call is an outgoing call or an incoming call.

If it is an incoming call, during a step E30 of the call management method of the invention, the proxy server 10 selects one or more available terminals having the capabilities to provide the service on the basis of the terminal selection rule SST already described.

Selection can be effected using the terminal table TT described above.

When the terminal has been selected, the middleware sends a request or notification message to the selected local terminal via the communications interface associated with that terminal, with a view to setting up a communications link between the selected terminal and the distant terminal via the communications module.

If a number of terminals are selected, the middleware sends a notification message to each of the selected terminals and then selects a terminal to set up said communications link that responded positively to said notification.

Alternatively, if more than one terminal are selected, the middleware selects a first of the selected terminals as a function of a rule of preference, then sends a notification message to the first terminal selected, and where applicable selects a second terminal if the first terminal selected does not respond to the notification.

If, following an action of a user of a selected terminal, that terminal responds to the notification received, the call is transferred to the terminal that has responded. In the step E40 a communications link is then set up between the distant terminal sending the call and the selected local terminal via the call receiver communications module and via the communications interface associated with the selected local terminal. This communications link conveys a content (voice, video, text, etc.) between these two terminals.

If it is a question in the step E10 of a request to establish an outgoing call with a contact D or E selected in the list of contacts of the device, the device selects a communications service as a function of a service selection rule SSS during a step E50 of the outgoing call management method of the invention using the tables TP and TT described above.

When the communications service has been selected, the middleware identifies a communications module of the device able to set up a communications link conforming to the selected service.

It then sends a request to the identified communications module with a view to setting up a communications link via the identified communications module between the terminal of the user sending the call signal and another distant terminal via which the selected contact can be contacted via the selected service.

A communications link is then set up in the step E60 between these two terminals via the identified communications module and via the communications interface receiving the call signal. This communications link is used to convey a content (voice, video, text, etc.) between the two terminals.

The invention claimed is:

1. A call manager device for managing calls on behalf of a plurality of local terminals with a plurality of distant terminals via a communications network, the call manager device comprising:
- a plurality of communications interfaces, each of the communications interfaces being in a one-to-one correspondence with one of the local terminals;
- a plurality of communications client modules, each of the communications client modules being adapted to set up a communications link of a determined communications service with one or more of the distant terminals via the communications network, wherein each of said plurality of communications interfaces is between a local terminal and a communications client module; and
- a call router configured for:
  - on reception by one of the communications client modules of an incoming call from a distant sending terminal, selecting one or more local terminals able to receive said call and redirecting said call to the communications interface corresponding to the selected local terminal in order to set up a communications link between said distant sending terminal and the selected local terminal via the communications client module receiving the call; and
  - on reception of an outgoing call request via a communications interface corresponding to a local sending terminal, identifying a communications client module able to set up a communications channel of a selected communications service and transmitting the request to the identified communications client module in order to set up a communications link of the selected service between a distant destination terminal and the local sending terminal via the identified communications client module.

2. The manager device according to claim 1, further comprising conversion means for converting between first data conforming to the generic transport protocols specific to one type of communication and second data conforming to a particular communications protocol of the same type used for a given communications service.

3. The manager device according to claim 1, further comprising service selector means for selecting a service for an outgoing call as a function of a cost criterion and/or a criterion of the availability of a contact using said distant terminal.

4. The manager device according to claim 1, further comprising terminal selector means for selecting a terminal for an incoming call as a function of a terminal selection rule taking account of data relating to the capabilities of said local terminals to implement communications services.

5. The manager device according to claim 4, wherein said terminal selection rule uses a criterion of the availability of said local terminals and/or a criterion of the availability of the users of said local terminals.

6. The manager device according to claim 1, further comprising means for sending an incoming call notification message to one or to each of the selected local terminals and said routing means select a local terminal that has responded positively to said notification.

7. The manager device according to claim 6, wherein said notification message is sent to said local terminals in an order established as a function of a rule of preference.

8. A proxy server comprising a call manager device according to claim 1.

9. A method of managing calls on behalf of local terminals with a plurality of distant terminals via a communications network, this method being implemented by a call manager device including a plurality of communications interfaces which are each in a one-to-one correspondence with one of said local terminals and a plurality of communications client modules which are each associated with a determined communications service of one or more communications services, wherein each of said plurality of communications interfaces is between a local terminal and a communications client module, wherein the method comprises:
- on reception by one of the communications client modules of an incoming call from a distant sending terminal, a step of selecting one or more local terminals and a step of redirecting said call to a communications interface corresponding to the selected local terminal in order to set up a communications link between said distant sending terminal and the selected local terminal via the communications client module receiving the call; and
- on reception of an outgoing call request via a communications interface corresponding to a local sending terminal, a step of identifying a communications client module able to set up a communications link of a selected communications service and a step of transmitting a request to the identified communications module in order to set up a communications link between a distant destination terminal and the local sending terminal via the identified communications client module.

10. A computer program stored on a computer memory and executing on a processor which, when used on a computer apparatus causes the processor to execute steps of the call management method according to claim 9.

11. A non-transitory computer-readable storage medium on which is stored a computer program comprising instructions for executing the steps of the call management method according to claim 9.

12. A gateway comprising a call manager device according to claim 1.

13. A residential gateway comprising a call manager device according to claim 1.

14. A process in which a computer executes instructions set forth in a computer program, the computer program including instructions for executing a call management method comprising the steps of:
- upon receipt, by a communications client module, of an incoming call from a distant sending terminal;
- selecting one or more local terminals; and
- redirecting said call to a communications interface corresponding to the selected local terminal in order to set up a communications link between said distant sending terminal and the selected local terminal via the communications client module receiving the call, wherein said communications interface is between said selected local terminal and said communications client module; and upon receipt of an outgoing call request via a communications interface corresponding to a local sending terminal;

identifying a communications client module able to set up a communications link of a selected communications service; and transmitting a request to the identified communications module in order to set up a communications link between a distant destination terminal and the local sending terminal via the identified communications client module.

\* \* \* \* \*